Sept. 3, 1929.  M. F. WEINRICH  1,727,187

REFRIGERATING DEVICE

Filed June 7, 1928

INVENTOR
Morris F. Weinrich
BY
Pennie, Davis, Marvin & Edmonds
ATTORNEYS

Patented Sept. 3, 1929.

1,727,187

UNITED STATES PATENT OFFICE.

MORRIS F. WEINRICH, OF LEONIA, NEW JERSEY, ASSIGNOR TO SILVERICE, INC., A CORPORATION OF NEW YORK.

REFRIGERATING DEVICE.

Application filed June 7, 1928. Serial No. 283,715.

This invention relates to refrigerating devices and has particular reference to that type of device which consists of a closed container within which is permanently sealed a congealable substance, which, after the congealable substance has been frozen, is used for chilling purposes. Inasmuch as the congealable substance is permanently sealed in the container, the refrigerating effect of the device may be renewed an innumerable number of times merely by placing the device in a suitable freezing mixture or material, in the crypt of a refrigerating machine, or the like.

These devices are generally satisfactory and very effective for chilling substances by imersion therein, and they are much more satisfactory than ice which dilutes the substance in which it is immersed by melting, is often unsanitary, must be crushed or frozen into suitably sized pieces for use, and its use is otherwise objectionable.

It has been found, however, that when these devices are being frozen a film of ice forms on the interior surface of the container and prevents the free transmission of the cold to the interior core of unfrozen liquid. Accordingly, unless the devices are subjected to freezing temperatures for a substantial period of time, the core of liquid does not become frozen, and the cooling effect of the devices is not as great as it would be if the liquid therein were entirely frozen.

Conversely, when the devices are being used for chilling purposes, the ice adjacent the interior surfaces thereof melts first and the remaining ice floats in this resulting liquid, whereby the chilling effect of the ice is decreased because the liquid forms a partial insulator which the cooling effect of the ice slowly penetrates.

It is the principal object of this invention to improve the refrigerating devices of the type described by providing means whereby these devices may be frozen more rapidly and the chilling effect thereof is increased. In accordance with this object, the invention comprehends the provision of conducting means within the device for transferring the cooling temperatures from the surface of the device to the interior thereof and vice versa. By transferring the freezing temperatures directly to the interior of the device, the core of the liquid will freeze substantially as rapidly as that adjacent the exterior surface of the device when the device is being frozen, and, by transferring the chilling temperatures from the core to the exterior surface of the device when it is in use, the chilling effect is accelerated and thus increased because the ice melts substantially uniformly throughout and more rapidly.

For a better understanding of the invention, reference is made to the accompanying drawings, in which Figure 1 is a cross-section through one of the refrigerating devices provided with one form of the thermal conducting body adapted to accelerate the freezing and chilling effect thereof;

Figure 1:
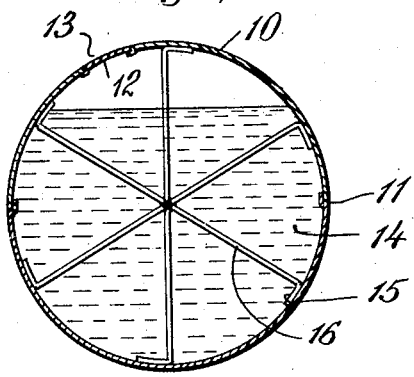

In these drawings, numeral 10 designates the container of the device, which is preferably made perfectly smooth and spherical so as to present a large conducting surface for the smallest possible volume, and be sanitary and readily handled. This container is preferably made of some good thermal-conducting material such as a high copper content metal, silver, or the like, which is formed into two hemi-spherical shells which are joined together by a sealed lap joint 11, one of these hemi-spherical shells being provided with an aperture 12 normally covered by a cap 13 which is pressed, crimped, soldered or otherwise fastened in place to make a sealed joint.

After the two halves of the container have been joined, the refrigerable material 14, which is preferably some congealable or otherwise refrigerable liquid such as pure water, is introduced through aperture 12 so as to nearly fill the container, and then the air over this water is removed by boiling the water, or the like. The air space allows for the expansion of the water while freezing, and thus prevents rupture of the container 10. The liquid 14 is thus hermetically and permanently sealed in the container 10 and need never be removed or replenished and cannot spill or leak out. These devices are then placed in a suitable freezing material or refrigerating machine to freeze the liquid 14, and while in this state may be used for chilling purposes.

Figure 2:
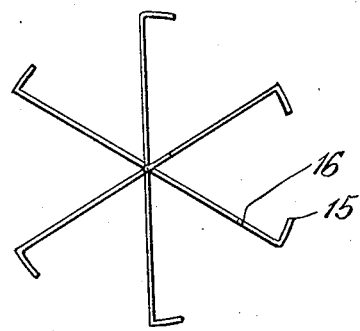
Fig. 2 shows the thermal conducting body in the device of Fig. 1.

In order to more rapidly transfer the freezing temperatures inwardly to the center of the liquid 14 during the freezing operation, and, conversely, to more rapidly transfer the chilling temperatures outwardly to the container shell 10 when the device is in use, a thermal-conducting body 15 is placed within the container which has portions extending from the inner wall of the container into the liquid 14. As shown in Fig. 2, this thermal-conducting body 15 may be made of copper wire or other good thermal-conducting material in the shape of a spider 15 which fits closely within container 10 so as to engage the inner surface thereof as shown in Fig. 1. This spider 15 has a number of diametral or radial extensions 16 which pass through the liquid 14 and project especially toward the center thereof, so that the whole body of liquid is traversed by these extensions 16.

Figure 3:
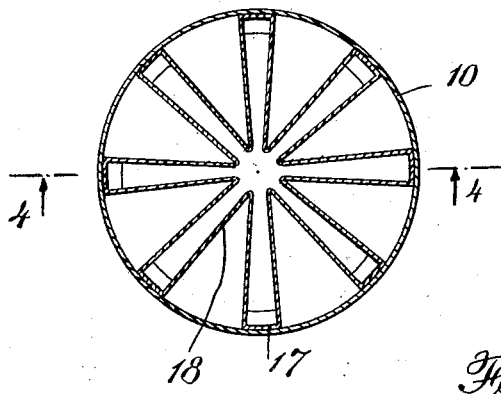
Figs. 3 and 4 are cross-sections of one of the devices provided with another form of thermal conducting body.
Figure 4:
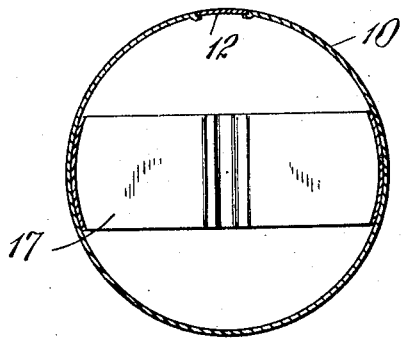

In Figs. 3 and 4 is shown another modification in which a strip of sheet metal 17 having good thermal-conducting properties, such as copper or the like, is folded alternately to form a star-shaped body which will fit within container 10 so that it engages the walls thereof at a plurality of spaced points. The spines 18 thus formed project from the wall of the container 10 toward the center of the congealable liquid 14, as shown in Fig. 3. Thus an inexpensive and novel thermal-conducting body is provided for the purpose described, and which may be inserted when the two halves of the ball are joined. It will be seen that the outer convolutions of the body 17 are formed so as to closely engage a relatively large area of the inner wall of the container 10 for the purpose of facilitating the conduction of the cold into and out of the device with respect to the exposed outer surface thereof.

Figure 5:
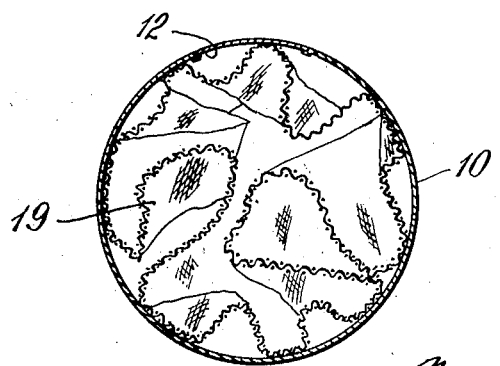
Fig. 5 shows a third form of the thermal conducting body.

Fig. 5 illustrates a third modification, in which the thermal-conducting body consists of a good thermal-conductor of flexible material such as copper mesh screen 19, or the like. This mesh material 19 may be inserted into container 10 before the two halves are joined, or the material 19 is flexible enough so that it may be inserted through the filling aperture before the cap 13 is emplaced after filling the container 10 with the congealable liquid. The material 19 is flexible and springy enough to expand so as to engage the inner wall of the container, or the material 19 may be expanded by a tool introduced through aperture 12 after this material has been inserted through aperture 12.

It will be seen that the new refrigerating device of this invention provides a very efficient and effective means for chilling materials by immersion or contact, and that the freezing and chilling effect of these devices is greatly accelerated by the provision of the interior thermal conductors which transmit cold to and from the center of the device.

When the devices are subjected to low temperature in order to freeze the liquid therein, the low temperature is conducted along the conductors and into the body of the liquid. The temperature of the liquid immediately in contact with these conductors is lowered, whereby the density thereof is increased so that it falls away from the conductors to be replaced by warmer liquid. Thus convection currents are set up in the liquid until the entire body thereof reaches the same low temperature, whereupon it freezes uniformly and rapidly. In this way the freezing of the liquid is greatly accelerated and the usual core of unfrozen liquid at the center of the devices is eliminated.

These convection currents are also set up in the liquid resulting from the melting of the ice within the device when it is in use for chilling purposes. Because of the conductors extending into the ice from the walls of the device, the heat transferred from the substance to be chilled is conducted along these conductors into the ice which is consequently melted. Because of the temperature gradient between the relatively warm conductors and the ice, the liquid which is being formed continuously begins to circulate by convection, thus carrying the relatively warm liquid to the ice to further melt it and carrying the cold liquid to the conductors to cool them. In this way the chilling effect of the devices is greatly accelerated, and as they are usually in use for only a relatively short time, such as for cooling a beverage or the like, they are more effective during the time when they are in use.

While several forms of the invention have been shown and described herein, it is to be understood that the invention is susceptible of many modifications within the scope of the claims made. For example, instead of inserting a free thermal-conducting body in the container as described, spines, partitions, projections, or the like, might be secured directly to or form part of the walls of the container, but the free body is preferred because of the facility with which it may be inserted and the labor and expense saved thereby, the principal requirement being that this conducting body be in intimate contact with the inner wall of the container at all times whereby its conducting area is greatly increased.

I claim:

1. A refrigerating device comprising a closed container, a refrigerable material therein, and a thermal conductor engaging the walls of the container and projecting into said material.

2. A refrigerating device comprising a closed container, a refrigerable material therein, and a thermal conductor joining opposite walls of the container and passing through the material.

3. A refrigerating device comprising a closed container, a refrigerable material therein, and thermal conducting body within the container, said body extending from the interior walls of the container substantially and into the material.

4. A refrigerating device comprising a container, a refrigerable material sealed therein, and projections engaging the interior walls of the container, whereby the normal area thereof is increased.

5. A refrigerating device comprising a container, a refrigerable material sealed therein, and a thermal conductor within the container in engagement with the material and the walls of the container.

6. A refrigerating device comprising a closed container, a refrigerable material therein, and a thermal conductor within the container, said conductor engaging a plurality of points in the interior surface of the container and extending into the material.

7. A refrigerating device comprising a container, a congealable liquid sealed therein, and a body of thermal conducting material immersed in the liquid within the container and engaging the walls thereof.

8. A refrigerating device comprising a container, a congealable liquid sealed therein, and a body of thermal conducting material and having a large conducting area immersed in the liquid, said body engaging a plurality of points in the interior surface of the container and extending substantially between these points.

9. A refrigerating device comprising a container, a congealable liquid sealed therein, and thermal conducting material engaging the interior wall of the container and extending through the liquid toward the center thereof.

10. A refrigerating device comprising a container, a congealable liquid sealed therein, and thermal conducting members projecting from the interior surface of the container toward the center of the liquid therein, whereby the normal conducting area of the surface is materially increased.

11. A refrigerating device comprising a container, a congealable liquid sealed therein, and a body of thermal conducting material immersed in the liquid so as to extend therethrough and engage the wall of the container.

12. A refrigerating device comprising a container, a congealable liquid sealed therein, and separate body of thermal conducting material immersed in the liquid, said body engaging a plurality of points in the wall of the container and having portions extending toward the center of the liquid.

13. A refrigerating device comprising a container, a refrigerable liquid sealed therein, and thermal conducting members in intimate contact with the interior wall of the container and projecting into the liquid, said members being adapted to facilitate heat transfer in the liquid whereby convection currents are induced therein.

14. A refrigerating device comprising a container, a refrigerating material sealed therein, and thermal conducting members in intimate contact with the interior wall of the container and projecting into the material, said members being adapted to promote a change in temperature of the material by facilitating heat transfer and inducing convection currents therein.

In testimony whereof I affix my signature.

MORRIS F. WEINRICH.